UNITED STATES PATENT OFFICE.

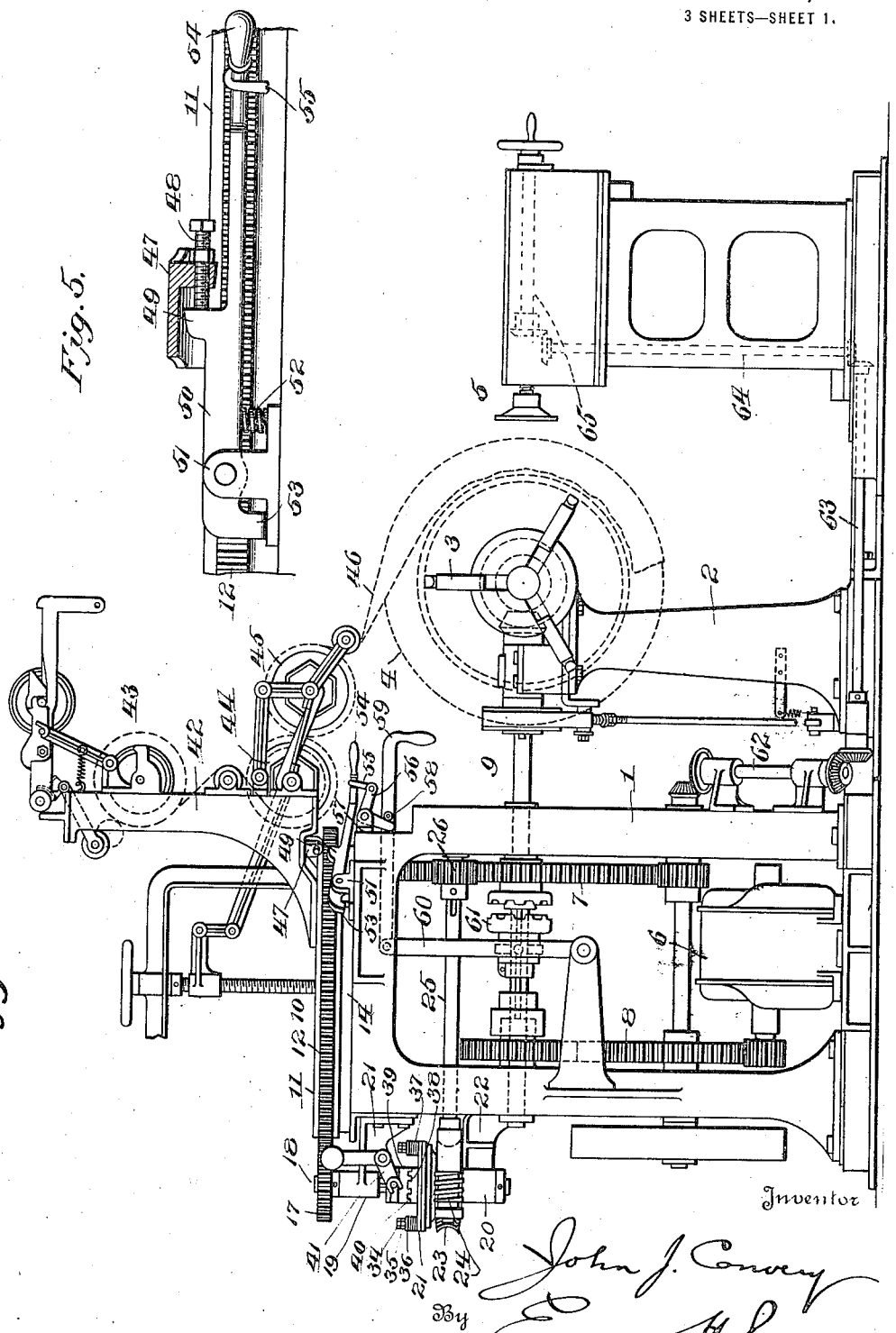

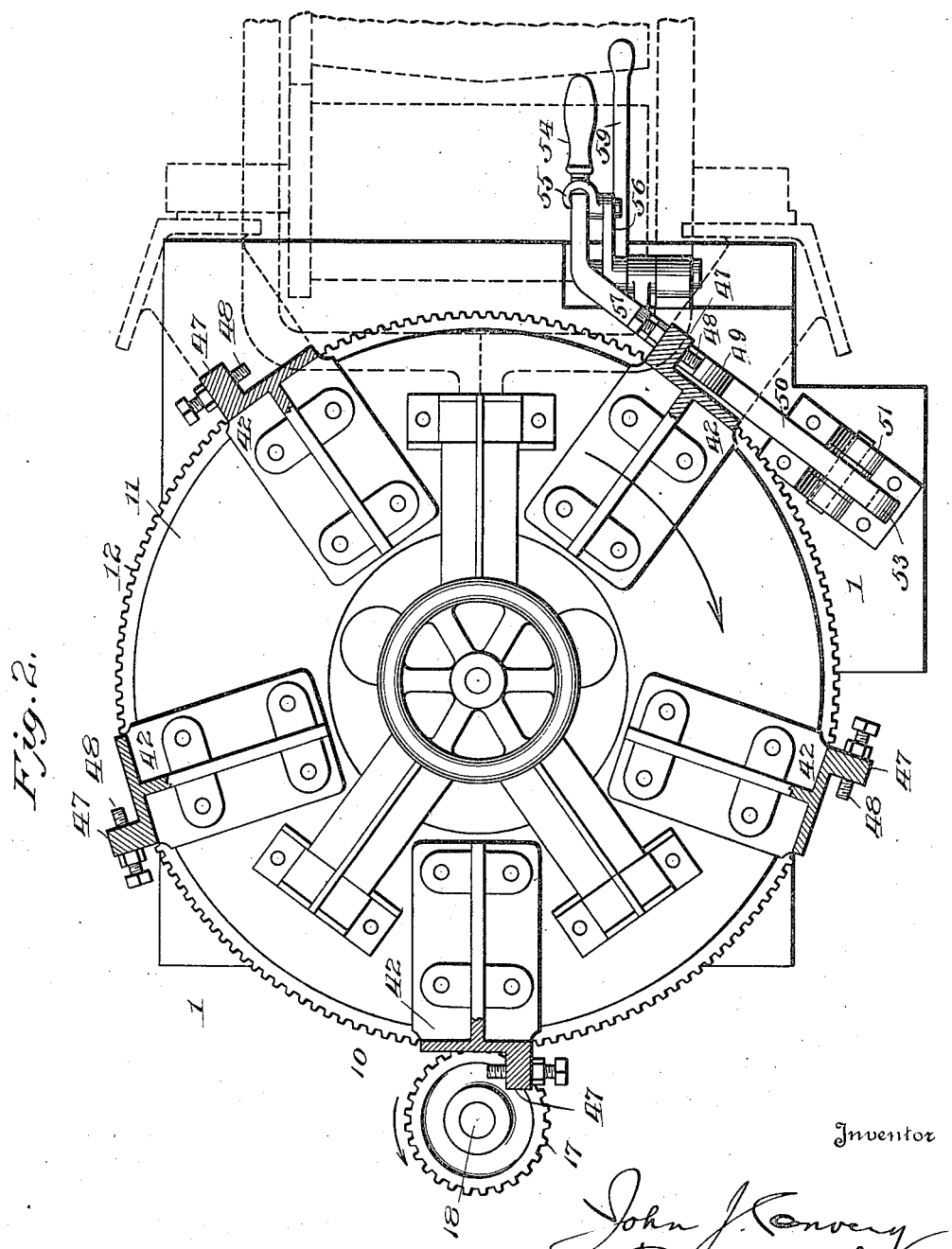

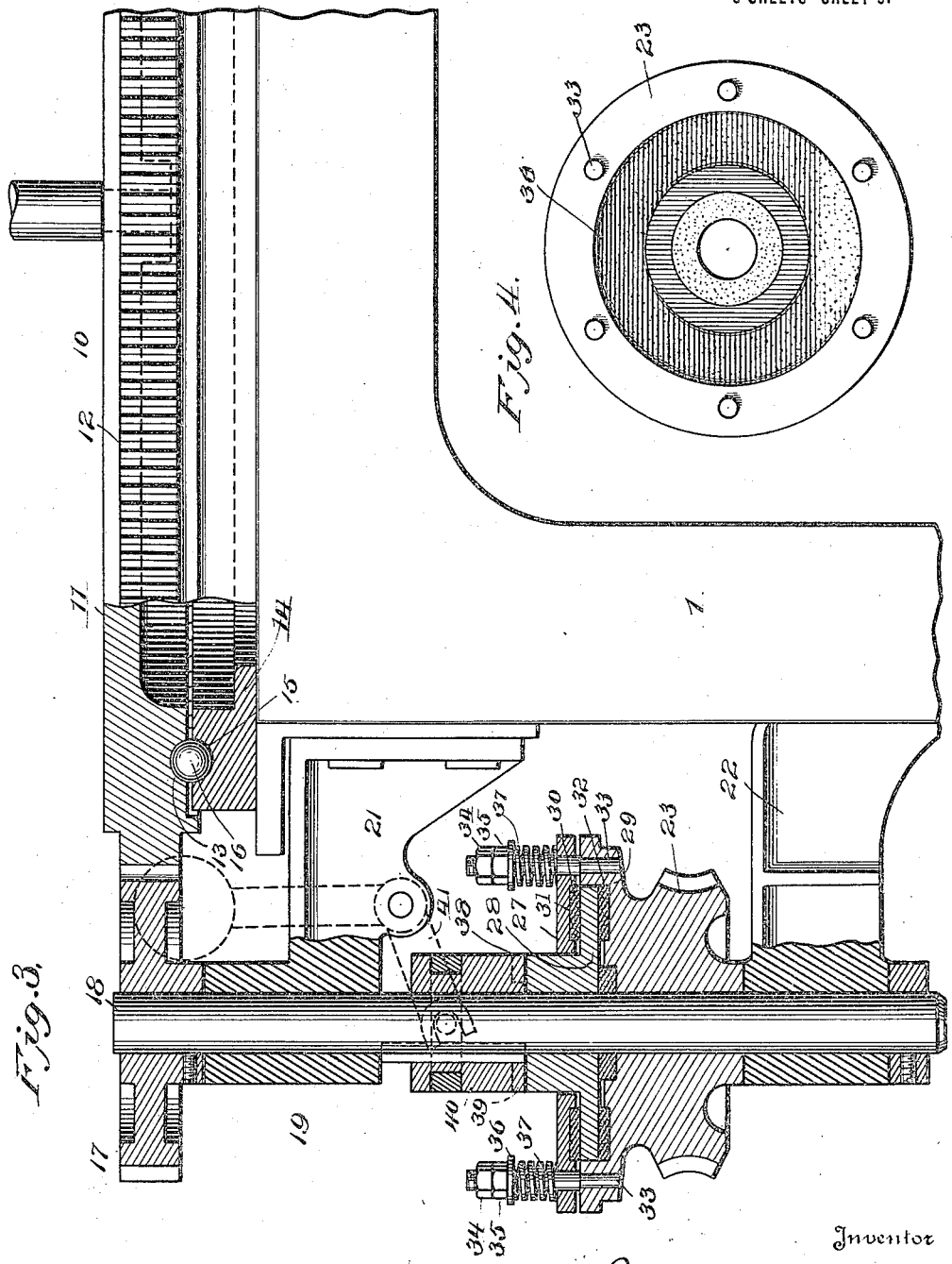

JOHN J. CONVERY, OF NEW YORK, N. Y., ASSIGNOR TO KELLY-SPRINGFIELD TIRE COMPANY, OF AKRON, OHIO, A CORPORATION OF NEW JERSEY.

TIRE-BUILDING MACHINE.

1,320,319.      Specification of Letters Patent.      Patented Oct. 28, 1919.

Application filed June 13, 1918. Serial No. 239,826.

*To all whom it may concern:*

Be it known that I, JOHN J. CONVERY, a citizen of the United States, residing at New York city, in the county of New York and State of New York, have invented certain new and useful Improvements in Tire-Building Machines, of which the following is a specification, reference being had therein to the accompanying drawing.

This invention relates to tire-building machines and has more especial reference to structures for supporting and supplying tire-fabric to a juxtaposed rotatable core for the building up of tire-carcasses thereon.

Nowadays, it is the practice in most tire-building plants, to supply to the tire-forming core successive strips or plies of fabric cut on a bias, the plies having their threads extending approximately at a 45° angle, but each respective ply has its threads extending in a direction opposite to those of the underlying or superposed ply. To this end, it is usual to mount a plurality of fabric-supplying or stock rolls or supports contiguous to the core, and these are disposed thereon so as to be manually brought successively into proper position with relation to the core. For this purpose, there is usually employed a revolving support or table on which are mounted, in a circular arrangement, two, three, four, five, or more fabric-supplying rolls, the table being turned on its central axis so as successively to bring one and then another of the rolls into a position opposite the core. The weight of the table, of the rolls, and of the fabric-stock is considerable, and this imposes a strain on the operator to move the table so as to dispose a particular roll in position in respect to the core. Besides, the operator must for the moment direct practically his entire attention to that one operation and, while so doing and temporarily, must neglect the stitching operations that are performed on the core.

It is, therefore, a primary object of my invention to provide means for automatically bringing these different fabric-supplying structures into position in relaton to the core and, then, automatically to arrest movement of the supporting-structure or turret at the proper time. This avoids the necessity for the operator manually to turn the structure and manually to arrest it.

Another object of the invention, and one of importance, is to provide power-operated means whereby the fabric-supplying structure or turret is rotated a predetermined distance, whereupon appropriate mechanism is brought into action automatically to arrest the movement of the turret and, thus, stop it exactly in position for withdrawing the fabric from a new supplying roll. This avoids the aforementioned manual operations and leaves the operator free to attend principally to the stitching operations.

Other objects and advantages are present in this invention, and these will become more apparent from the following description:

In order that the invention may be more readily comprehended, I have shown in the acompanying drawings a preferred embodiment and utilization of the same; but it is to be understood that these drawings are merely illustrative and that the invention is susceptible of considerable modification and variation without departing from its spirit and without sacrificing any of its salient advantages.

In these drawings:

Figure 1 is a view in elevation of a tire-building machine constructed in accordance with my invention;

Fig. 2 is a view in horizontal section thereof;

Fig. 3 is a fragmentary view partly in elevation and partly in vertical section, and on an enlarged scale;

Fig. 4 is a detail view of a component of a friction-clutch forming a part of the turret-rotating mechanism; and Fig. 5 is a fragmentary view, on an enlarged scale, of the turret-arresting device.

In these drawings, the reference-numeral 1 designates a turret-supporting structure. Arranged in juxtaposition to this is a core-supporting structure 2 on which is mounted a core-chuck 3 for driving a tire-forming core 4. Disposed in operative relation to the core is stitcher-mechanism, designated generally by the reference-numeral 5.

The core is, in this instance, to be driven for rotative movement by means of a prime-mover or motor 6 alternately through low-speed gearing 7 and high-speed gearing 8, of any appropriate make. The low and high speed gearings are adapted to actuate a horizontal drive-shaft 9 which is suitably geared to the chuck 3.

It will be understood that the low-speed gearing is in constant and direct connection with the prime-mover 6 which constitutes the primary drive for a fabric-supplying turret (designated generally by the numeral 10), for the tire-forming core 4, and for the stitcher mechanism 5.

The turret comprises an annular member or table 11 having its periphery provided with gear-teeth 12. Adjacent its periphery and on its under side, the member 11 is provided with an annular race or ball-groove 13. Underlying the member 11 is a supporting-ring 14 which is also provided with an annular race or ball-groove 15. In the grooves 13 and 15 a plurality of balls 16 are adapted to track and these support the annular member 11 on the ring 14.

Interposed between the annular member and the low-speed gearing 7 is mechanism for driving this member. This comprises a pinion 17 keyed to a short vertical shaft 18 which is journaled in bearings 19 and 20 mounted in brackets 21 and 22, respectively, outstanding from the supporting-structure 1. Loosely mounted on the shaft 18 is a worm-wheel 23 adapted to mesh with a worm 24 that is fast on a horizontal shaft 25 which in turn carries a gear 26 adapted to mesh with the low-speed gearing 7.

It will be understood that the worm-wheel 23, being in driving connection with the low-speed gearing 7, as already described, is constantly rotating. To connect the shaft 18 to the worm-wheel 23, I provide clutch-mechanism which is of such construction as to permit slippage when sufficient resistance is offered, in a manner presently to be explained. This clutch-mechanism comprises a clamping-disk 27 which overlies the upper surface of the worm-wheel 23 but is spaced apart therefrom by a clutch-disk 28 which carries annular rings 29 and 30 of leather or similar material. The clamping-ring 27 and the worm-wheel 23 are provided with grooves 31 and 32, respectively, to receive these leather rings. The clamping-disk 27 is connected to and is rotated by the worm-wheel 23 by means of a plurality of stud-bolts 33, these being threaded into the worm-wheel and carry at their upper ends nuts 34 and 35, the latter bearing against a washer 36. Between this washer and the upper face of the clamping-disk is a spring 37. By means of these stud-bolts and spring, a graduated and yielding pressure of the clamping-disk on the leather rings 29 and 30 can be obtained, for a purpose presently to be explained.

The clutch-disk 28 is provided with jaw teeth 38 adapted to be engaged by similar teeth 39 on a clutch-member 40. To engage or disengage the clutch-member 40 with the member 28, a clutch-shifter 41 is provided. This shifter is utilized only when it is desired to permit free rotation of the annular member 11; as, for instance, when it might be desired to reverse the rotative movement of the fabric-supporting structure. It will, therefore, be understood that normally the annular member 11 is constantly in driving connection with the worm-wheel 23 and, thus, with the motor 6.

The foregoing constitutes the driving mechanism for effecting rotative movement of the turret. As it is desirable to arrest such movement at predetermined positions, means (preferably and as shown) are provided for accomplishing this result, and these will presently be described.

Upstanding from the annular member 11 is a plurality of uprights or standards 42, each of these constituting a support for a fabric-supplying roll 43 and for a pair of associated fabric-stretching rolls 44 and 45. These rolls are geared together, and over them pass the ply or strip of fabric (designated generally by 46) onto the core 4, as shown in dotted lines in Fig. 1. Herein, I do not make specific claims to this particular structure, as it constitutes the subject-matter of another application, Serial No. 239,827, filed June 13, 1918.

There may be any desired number of the uprights or standards 42; and in Fig. 2 I have illustrated five of these. It will, therefore, be understood that this fabric-supporting structure, comprising the annular member 11, the uprights 42 mounted thereon, the supply rolls 43, etc., will, in the present machine, have five fabric-supplying positions; and this contemplates and requires the arresting of the supporting-structure at five different operating points so that each of the fabric-supplying rolls 43 may be positioned opposite the core 4, successively. To the end that the supporting-structure may be arrested in its rotative movement at the proper point and, thus, accurately position each fabric-supplying roll 43 opposite the core 4, I have provided the aforementioned arresting mechanism: This comprises, on each of the uprights 42, a pendant bracket 47 to which is threaded an adjustable screw or engaging stop 48. Normally occupying a position in the path of the screws 48 on each of the uprights 42 is a relatively-stationary, engageable stop 49 formed on a stop-positioning lever 50, this being fulcrumed in an upstanding bracket 51 mounted on the upper portion of the supporting structure 1. Interposed between the lever 50 and the bracket 51 is a spring 52, the function of which is to maintain the lever 50 in its upper or screw-engaging position, as shown in Fig. 5. To limit the swinging movement of the lever 50, its end (adjacent the bracket 51) is provided with a pendant extension 53 adapted to engage the horizontal portion of the bracket 51. By means of the handle 54 on the lever 50, the latter may be operated to position its engageable stop 49 out of the path of any of the engaging stops 48. Usually, this is done if it be desired to permit the fabric-supporting structure to rotate, for any purpose, without being arrested at any of its defined positions.

It will be understood, in view of the fact that the supporting structure is, as aforementioned, constantly in direct driving connection with the low-speed gear 7, that when any of the engaging stops or arresting devices 48 engages the stop 49, these and the turret will be positively arrested in their rotative movement, and this is permitted by reason of the fact that a slippage is permitted between the worm-wheel 23 and the clutch members 39 and 40, this slippage being made variable by means of the adjusting nuts 34 and 35 whereby the tension of the spring 37 may be changed at the will of the operator.

If it be desired to position the stop 49 out of the path of movement of any of the arresting devices 48, as for instance at the time that the high-speed gearing is brought into operation, I provide means whereby this may be done automatically: To this end, a link 55 is hooked over the lever 50 adjacent the handle 54 and is pivotally connected to a bell-crank lever 56 fulcrumed on a bracket 57 on the supporting structure 1. The free end of the bell-crank-lever engages a stud 58 on a clutch-shifting member 59, this being connected to a clutch-lever 60 which in turn is connected to one member of a jaw-clutch 61 by which the low-speed gearing 7 is disconnected from the shaft 9 and the high-speed gearing 8 is connected thereto. When the member 59 is pushed toward the left (Fig. 1) to operate the clutch 61, the stud thereon engages the bell-crank-lever 56 and causes the lever 50 to be rocked on its fulcrum and thereby lowers the stop 49 out of engaging position. When, however, the member 59 is returned to normal position and the stud 58 is in turn restored to normal position, the spring 52, acting on the lever 50, will return it and the stop 49 to normal position. This mechanism, just described, facilitates the operation of the lever 50 when the high-speed mechanism is clutched to the shaft 9 to drive the core 4 at high speed; but it is not an essential mechanism in the operation of the machine.

Operation: The operation of the various structures and mechanisms, already described, is as follows:

Assuming that the low-speed gearing 7 is clutched to the shaft 9 and that, therefore, the core 4 has been rotated at low speed to draw the ply of fabric from the supply-roll 43 and over the rolls 44 and 45 and, thereby, effected a longitudinal stretch of the ply as it was being positioned on the core, the turret (including the annular member 11) will, during that time, have remained stationary; but, the proper length of ply having been positioned on the core and cut by the operator, the operator then swings the lever 50 downwardly to disengage the stop 49 from the arresting device 48, whereupon the annular member 11 will be free to rotate, and is driven (through the mechanism already described) by the low-speed gearing 7. Simultaneously with the downward swinging of the lever 50, or otherwise, the high-speed gearing 8 is brought into connection with the shaft 9 so that the core may then be driven at high speed. Then, as soon as another of the arresting devices 48 engages the stop 49, the annular member 11, by reason of the driving parts—comprising the pinion 17, shaft 18, worm 23, the interposed clutch device (already described), shaft 23, and gear 26—will rotate the turret and, thus, the different fabric-supplying rolls mounted on the uprights 42, until the arresting device 48 on any particular upright 42 is brought into engaging position with the stop 49 on the lever 50—this stop 49, it being understood, normally occupying an arresting position. When any particular arresting device engages the stop 49, the annular member 11 and, thus, the different uprights 42 and supporting rolls 43 will cease their rotative travel, but the gear 23 will continue to rotate, though rotation of the shaft 18 will stop by reason of the slippage permitted in the clutch, as already detailed. It will be understood that the annular member 11 is stationary while the fabric is being drawn from the supply roll 43 and positioned on the core 4, and that it is again brought into rotative movement when a new ply is to be positioned on the core 4 and a different supplying-roll is to be brought opposite thereto.

An important function of the friction-clutch and of the parts controlled thereby is to effect a normal tendency of the annular member 11 to move rotatively under the action of the driving mechanism; and, thus, the arresting device 48 is maintained in constant engagement with the stop 49 while the lever 50 is in its holding position, so that the entire structure is held in proper position and, thus, the fabric-roll 43 and the tension rolls 44 and 45 are, by these means, accurately positioned in relation to the core and then rigidly held in that position while the fabric is being drawn from the fabric-roll 43 over the tension rolls 44 and 45 and onto the core 4, the friction-drive operating to develop a normal tendency of the annular member 11 to rotate, thereby holding the engaged arresting device 48 firmly against the stop 49. Were such means not provided, there would be a tendency of the annular member 11 to have more or less of a retrograde movement and thus shift the fabric-rolls 43 out of proper relation to the core 4. These must be in proper position and alinement during the fabric-stretching operation aforementioned, and also so that the fabric may be properly drawn evenly onto the core.

The fact has already been referred to that the drive for the core 4 is also common to the turret-rotating structure. It is, moreover, common to the stitcher-mechanism 5; and, to this end, such mechanism is, by the shafting 62, 63, and 64, and feed-screw 65, in driving connection with the motor 6, as shown in Fig. 1. Thus, these three structures, the core, the turret, and the stitcher mechanism derive motion from a single prime-mover: While the turret-turning is being effected by the driving mechanism, the core may or may not be rotated, this being governed by the convenience of the operator. After the fabric has been stretched on the core, cut to proper length and spliced thereon, the operator throws the core into high-speed rotation, and also starts the stitcher-mechanism. He may then set the turret-arresting devices and permit the turret to be rotated so as to bring the next supply of fabric into position. Thus, the core will be rotated at high speed, the stitcher-mechanism will be operating, and the turning of the turret will be accomplished, all simultaneously, or in succession. On the other hand, the turret will be held stationary while the fabric is being supplied therefrom onto the core, during the fabric-stretching operation, for example. When this latter operation is being accomplished, the stitcher-mechanism will be at rest. Usually, while the core is rotating at high speed, the stitcher-mechanism is being operated by the driving mechanism.

What I claim is:

1. A support, a fabric-supplying structure rotatable thereon, power-operated means for effecting rotative movement of the fabric-supplying structure and slippage-means associated with the structure-rotating means and operative to promote a normal tendency of the supplying structure to move under the impelling influence of its rotating means.

2. A tire-building machine including a core, driving-mechanism therefor, a fabric-supplying structure juxtaposed to the core, means deriving movement from the core-driving mechanism for power-driving the fabric-supplying structure in respect to the core, means for arresting the movement of the fabric-supplying structure in any of a plurality of positions in respect to the core and slippage-means associated with the structure-driving means and operating to permit a normal tendency of the supplying-structure to move under the impelling influence of its driving means.

3. A tire-building machine including a rotatable core, driving mechanism therefor, a fabric-supplying structure juxtaposed to the core and comprising an annular support, a plurality of uprights thereon, a fabric-supplying roll on the uprights, means interposed between the core-driving mechanism and the annular support for effecting rotative movement to the support by the core-driving mechanism, means engageable by the annular support to arrest the same at any of a plurality of positions in respect to the core and a slippage-device associated with the support-rotating means and operative to permit a normal tendency of the support to move under the influence of its rotating means.

4. A tire-building machine comprising a rotatable core, a driving mechanism therefor, an annular support juxtaposed to the core and geared to the core-driving mechanism, a plurality of roll-supporting uprights mounted on the annular support and positionable thereby in relation to the core, means for arresting rotative movement of the annular support comprising a plurality of arresting devices carried by the support, a relatively stationary stop common to said arresting devices and positionable into and out of the path thereof, and a slippage-device associated with the annular support and active to permit a normal tendency of the support to move under the influence of the driving-mechanism.

5. A tire-building machine comprising a rotatable core, a driving mechanism therefor, an annular support juxtaposed to the core and geared to the core-driving mechanism, a plurality of roll-supporting uprights mounted on the annular support and positionable thereby in relation to the core, and means for arresting rotative movement of the annular support comprising a plurality of arresting devices carried by the support, and a stop common to said arresting devices and positionable into and out of the path thereof, the arresting of the annular support being automatically effected independently of the core-driving mechanism, such mechanism continuing to rotate the core.

6. A tire-building machine including a rotatable core, mechanism for driving the same comprising a low-speed gear and a high-speed gear, a fabric-supplying support juxtaposed to the core and rotatable in relation thereto, means interposed between the low-speed gear and the annular support for driving the latter by power including a driving connection with the low-speed gear and a friction clutch, and means for arresting the rotative movement of the annular support, the friction clutch then operating to permit the stopping of the annular support without arresting the low-speed gear.

7. In a tire-building machine, a support, a rotatable fabric-supplying structure thereon, a tire-core juxtaposed to the support, driving mechanism common to the fabric-supplying structure and the core for rotating the table and the core and a slippage-device associated with the structure-rotating mechanism and operating, while the core is active, to permit a normal tendency of the table to move under the impelling influence of its rotating mechanism.

8. In a tire-building machine, a support, a rotatable fabric-supplying structure thereon, a tire-core juxtaposed to the support, driving mechanism common to the fabric-supplying structure and the core for intermittingly rotating the table and for rotating the core at high and low speeds at the will of the operator and a slippage-device associated with the table-rotating mechanism and having a normal tendency to permit the table to move under the impelling influence of its rotating mechanism while the core is at rest.

9. In a tire-building machine, a support, a rotatable fabric-supplying structure thereon, a plurality of roll-supporting instrumentalities on the structure, a tire-core juxtaposed to the support, driving mechanism common to the fabric-supplying structure and the core for rotating the table and the core, means for bringing the structure to rest when one of said roll-supporting instrumentalities is positioned by the structure opposite the core and a slippage-device associated with the table-rotating mechanism and having a normal tendency to permit the table to move under the impelling influence of its rotating mechanism while the core is at rest.

10. In a tire-building machine, a support, a fabric-supplying structure rotatably mounted thereon, a plurality of roll-supporting instrumentalities arranged on the structure in spaced-apart relation, a tire-core juxtaposed to the support, driving mechanism common to both the structure and the core for effecting rotative movement to the structure and the roll-supporting instrumentalities carried thereby and for rotating the core at low and high speeds at the will of the operator, means for automatically arresting the movement of the structure when one of the supporting instrumentalities is disposed by the structure opposite the core and a slippage-device associated with the table-rotating mechanism and having a normal tendency to permit the table to move under the impelling influence of its rotating mechanism while the core is at rest.

11. In a tire-building machine, a support, a fabric-supplying structure rotatably mounted thereon, a plurality of roll-supporting instrumentalities arranged on the structure in spaced-apart relation, a tire-core juxtaposed to the support, driving mechanism common to both the structure and the core for effecting rotative movement to the structure and the roll-supporting instrumentalities carried thereby and for rotating the core at low and high speeds at the will of the operator, means for automatically arresting the movement of the structure when one of the supporting instrumentalities is disposed by the structure opposite the core and a slippage-device associated with the table-rotating mechanism and having a normal tendency to permit the table to move under the impelling influence of its rotating mechanism while the core is at rest, and means for then actuating the low-speed drive of the core.

12. In a tire-building machine, a support, a rotatable fabric-supplying structure thereon, a plurality of roll-supporting instrumentalities on the structure, a tire-core juxtaposed to the support, driving mechanism common to the fabric-supplying structure and the core for rotating the structure and the core, means for automatically arresting the rotative movement of the structure when one of the roll-supporting instrumentalities is positioned by the structure opposite the core, and manually-operated means for disposing said arresting means in an inactive position.

13. In a tire-building machine, a support, a rotatable fabric-supplying structure thereon, a plurality of roll-supporting instrumentalities on the structure, a tire-core juxtaposed to the support, driving mechanism common to the fabric-supplying structure and the core for rotating the structure and the core, means for automatically arresting the rotative movement of the structure when one of the roll-supporting instrumentalities is positioned by the structure opposite the core, and manually operated and automatically actuated means for disposing said arresting means in an inactive position.

14. In a tire-building machine, a support, a rotatable fabric-supplying structure thereon, a plurality of roll-supporting instrumentalities on the structure, a tire-core juxtaposed to the support, driving mechanism common to the fabric-supplying structure and the core for rotating the structure and the core, means for automatically arresting the rotative movement of the structure when one of the roll-supporting instrumentalities is positioned by the structure opposite the core including coacting stops carried by the support and structure, and means for manually disconnecting the stops to permit continued rotation of the structure.

15. In a tire-building machine, a support, a rotatable fabric-supplying structure thereon, a plurality of roll-supporting instrumentalities on the structure, a tire-core juxtaposed to the support, driving mechanism common to the fabric-supplying structure and the core for rotating the structure and the core, means for automatically arresting the rotative movement of the structure when one of the roll-supporting instrumentalities is positioned by the structure opposite the core including coacting stops carried by the support and structure, and means for manually disconnecting the stops to permit continued rotation of the structure under the action of the driving mechanism.

16. In a tire-building machine, a support, a rotatable fabric-supplying structure thereon, a plurality of roll-supporting instrumentalities on the structure, a tire-core juxtaposed to the support, driving mechanism common to the fabric-supplying structure and the core for rotating the structure and the core, means for automatically arresting the rotative movement of the structure when one of the roll-supporting instrumentalities is positioned by the structure opposite the core including coacting stops carried by the support and structure, one of said stops being adjusted to vary the instant of engagement of the stops.

17. In a tire-building machine, a support, a rotatable fabric-supplying structure thereon, a plurality of roll-supporting instrumentalities on the structure, a tire-core juxtaposed to the support, driving mechanism common to the fabric-supplying structure and the core for rotating the structure and the core, means for automatically arresting the rotative movement of the structure when one of the roll-supporting instrumentalities is positioned by the structure opposite the core including coacting stops carried by the support and structure, and a positioning-lever carrying one of the stops.

18. In a tire-building machine, a support, a rotatable fabric-supplying structure thereon, a plurality of roll-supporting instrumentalities on the structure, a tire-core juxtaposed to the support, driving mechanism common to the fabric-supplying structure and the core for rotating the structure and the core, and means for automatically arresting the rotative movement of the structure when one of the roll-supporting instrumentalities is positioned by the structure opposite the core including coacting stops carried by the support and structure, a positioning-lever carrying one of the stops, and means for maintaining said lever in operating position.

19. In a tire-building machine, a support, a rotatable fabric-supplying structure thereon, a plurality of roll-supporting instrumentalities on the structure, a tire-core juxtaposed to the support, driving mechanism common to the fabric-supplying structure and the core for rotating the structure and the core, means for automatically arresting the rotative movement of the structure when one of the roll-supporting instrumentalities is positioned by the structure opposite the core including coacting stops carried by the support and structure, a positioning-lever carrying one of the stops, means for maintaining said lever in operating position, and means connected to the lever for automatically moving it against the action of the position-maintaining means.

20. In a tire-building machine, a support, a rotatable fabric-supplying structure thereon, a plurality of roll-supporting instrumentalities on the structure, a tire-core juxtaposed to the support, driving mechanism common to the fabric-supplying structure and the core for rotating the structure and the core, means for automatically arresting the rotative movement of the structure when one of the roll-supporting instrumentalities is positioned by the structure opposite the core including coacting stops carried by the support and structure, a positioning-lever carrying one of the stops, means for maintaining said lever in operating position, means connected to the lever for automatically moving it against the action of the position-maintaining means, and a clutch-shifting device for changing the speed of the driving mechanism and with which said lever-moving means is connected.

21. In a tire-building machine, a support, a structure rotatably mounted thereon, driving mechanism for effecting rotative movement of the structure on the support, means for automatically bringing the structure to rest periodically, a manually-operated device for rendering said means inactive and thereby permit continued movement of the structure and a slippage-device associated with the structure-driving mechanism and operative to permit a normal tendency of the structure, after being brought to rest, to move under the impelling influence of its driving-mechanism.

22. In a tire-building machine, a support, a structure rotatably mounted thereon, driving mechanism for effecting rotative movement of the structure on the support, means for periodically arresting the rotative movement of the structure including coacting stops carried by the support and structure, and a lever carrying one of the stops.

23. In a tire-building machine, a support, a structure rotatably mounted thereon, driving mechanism for effecting rotative movement of the structure on the support, means for periodically arresting the rotative movement of the structure including coacting stops carried by the support and structure, a positioning-lever carrying one of the stops, and a spring acting on the lever for maintaining it in active position.

24. In a tire-building machine, a support, a structure rotatably mounted thereon, and driving mechanism for effecting rotative movement of the structure on the support, including a clutch and a slippage-device associated therewith and permitting a normal tendency of the rotatable structure to move under the influence of its driving-mechanism.

25. In a tire-building machine, a support, a structure rotatably mounted thereon, and driving mechanism for effecting rotative movement of the structure on the support, including a constantly-rotating member, a jaw-clutch associated therewith, and a friction-clutch associated with the jaw-clutch and acting under the influence of the rotatable structure.

26. In a tire-building machine, a support, a structure rotatably mounted thereon, and driving mechanism for effecting rotative movement of the structure on the support including a friction-clutch and a slippage device associated therewith, and coacting means carried by the structure and support for automatically arresting rotative movement of the structure.

27. In a tire-building machine, a support, a structure rotatably mounted thereon, and driving mechanism for effecting rotative movement of the structure on the support, including a friction-clutch, and means for automatically arresting rotative movement of the structure, comprising coacting stops carried by the structure and support, said friction-clutch serving to maintain said stops active one against the other.

28. In a tire-building machine, a support, a structure rotatably mounted thereon, and driving mechanism for effecting rotative movement of the structure on the support, including a friction-clutch, and means for automatically arresting rotative movement of the structure, comprising coacting stops carried by the structure and support and periodically engageable, said structure having a normal tendency, under the impelling influence of the driving mechanism, to slip against the holding action of the friction-clutch and thereby maintain the stops in engagement.

29. In a tire-building machine, a support, a structure rotatably mounted thereon, and driving mechanism for effecting rotative movement of the structure on the support, including a friction-clutch, means for automatically arresting rotative movement of the structure, comprising coacting stops carried by the structure and support and periodically engageable, said structure having a normal tendency, under the impelling influence of the driving mechanism, to slip against the normal holding action of the friction-clutch and thereby maintain the stops in engagement, and means for disengaging the stops.

30. In a tire-building machine, a support, a table rotatable thereon and provided with gear-teeth on its periphery, driving mechanism for the table including a gear meshing with the table, a motor, driving connection between the motor and gear including a friction-clutch, and means for periodically arresting rotative movement of the table.

31. In a tire-building machine, a support, a table rotatable thereon and provided with gear-teeth on its periphery, driving mechanism for the table including a gear meshing with the table, a motor, a driving connection between the motor and gear including a friction-clutch, means for varying the frictional resistance of the clutch, and means for periodically arresting rotative movement of the table.

32. A tire-building machine including a support, a rotatable structure thereon, driving mechanism for effecting rotative movement of the structure on the support, means for periodically arresting the structure, and means associated therewith for permitting a normal tendency of the structure to rotate under the influence of the driving mechanism.

33. A tire building machine including a support, a shiftable structure thereon, driving mechanism for actuating the structure, means for periodically arresting the structure, and means including a slippage device for permitting a tendency of the structure to move under the influence of its driving mechanism.

34. A tire building machine including a support, a shiftable structure thereon, coacting elements carried by the support and structure for periodically arresting movement of the latter, and means for permitting a normal tendency of the elements to be maintained in engagement with each other.

35. A tire building machine including a support, a rotatable structure thereon, coacting elements carried by the support and structure for periodically arresting movement of the latter, and means for permitting a normal tendency of the elements to be maintained in engagement with each other, including a slipping-device associated with the engagement-permitting means.

In testimony thereof I affix my signature is presence of two witnesses.

JOHN J. CONVERY.

Witnesses:
 GERTRUDE PETERSON,
 FRANCES WALD.